United States Patent [19]

Orlett et al.

[11] 4,292,287

[45] Sep. 29, 1981

[54] METHOD FOR DIRECTLY RECOVERING FLUORINE FROM GAS STREAMS

[75] Inventors: Michael J. Orlett, Portsmouth; Anthony J. Saraceno, Waverly, both of Ohio

[73] Assignee: The United States of America as represented by the United States Department of Energy, Washington, D.C.

[21] Appl. No.: 143,246

[22] Filed: Apr. 24, 1980

[51] Int. Cl.$^3$ .............................................. B01D 53/34
[52] U.S. Cl. .................................... 423/241; 423/464; 423/500; 264/117
[58] Field of Search ............... 423/241, 464, 500, 503; 264/117; 23/313

[56] References Cited

U.S. PATENT DOCUMENTS 3,372,004  3/1968  Richardson et al. ........... 264/117 X
3,989,808  11/1976  Asprey ................................. 423/503

Primary Examiner—G. O. Peters
Attorney, Agent, or Firm—Fred O. Lewis; Stephen D. Hamel; Richard G. Besha

[57] ABSTRACT

This invention is a process for the direct recovery of gaseous fluorine from waste-gas streams or the like. The process comprises passing the gas stream through a bed of anhydrous $K_3NiF_6$ pellets to fluorinate the same to $K_3NiF_7$ and subsequently desorbing the fluorine by heating the $K_3NiF_7$ pellets to a temperature re-converting them to $K_3NiF_6$. The efficiency of the fluorine-absorption step is maximized by operating in a selected and conveniently low temperature. The desorbed fluorine is highly pure and is at a pressure of several atmospheres. Preferably, the $K_3NiF_6$ pellets are prepared by a method including the steps of forming agglomerates of hydrated $K_3NiF_5$, sintering the agglomerates to form $K_3NiF_5$ pellets of enhanced reactivity with respect to fluorine, and fluorinating the sintered pellets to $K_3NiF_6$.

13 Claims, 4 Drawing Figures

METHOD FOR DIRECTLY RECOVERING FLUORINE FROM GAS STREAMS

BACKGROUND OF THE INVENTION

1. Field of the Invention

This invention, which is a result of a contract with the U.S. Department of Energy, relates generally to processes for the removal of gaseous fluorine from gas streams. More particularly, it relates to processes for the direct recovery of fluorine from gas streams which also contain, for example, nitrogen and/or oxygen.

As used herein, the phrase "direct recovery of fluorine" refers to dynamic processes in which a stream of fluorine-containing gas is passed through a bed of material to effect removal, or absorption, of the fluorine by chemical reaction with the bed, the absorbed fluorine subsequently being recovered as a gas by heating of the bed.

2. Prior Art

Various industrial processes utilize elemental fluorine ($F_2$) and, as a result, generate vent streams containing excess or unreacted $F_2$. One such process is the manufacture of uranium hexafluoride for use as the process gas in gaseous diffusion plants for the separation of uranium isotopes. In that process, $UO_3$ or $U_3O_8$ is reacted with excess $F_2$ at an elevated temperature to produce $UF_6$. The vent stream for the process typically comprises from 50 to 75 mole percent $F_2$, the remainder of the gas consisting essentially of oxygen. The fluorine emissions from such processes must be controlled for environmental reasons. Furthermore, the value of the discharged $F_2$ is a significant operating cost. In general, the approach to decreasing $F_2$ emissions has been to convert them chemically to less toxic forms, such as $CaF_2$ or $CF_4$. However, such processes do not permit the re-use of the captured $F_2$ and in some instances generate significant quantities of solid waste products.

As compared with chemical-conversion processes of the kind referred to above, processes for the direct recovery of fluorine from vent streams provide at least two important advantages: they minimize the generation of solid waste and they permit re-use of the captured flurorine. A previously known process for the direct recovery of fluorine from vent streams is based on the following reversible reaction:

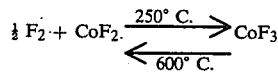

That is, the $F_2$-containing gas is passed through a fixed bed of cobalt difluoride at an elevated temperature to convert the latter to the trifluoride, thus absorbing fluorine; subsequently, the bed is heated to a higher temperature to evolve the absorbed fluorine. Unfortunately, that process is not entirely satisfactory because of excessive corrosion of materials of construction, owing to the high temperature of regeneration.

U.S. Pat. No. 3,989,808 (issued on Nov. 2, 1976) describes a static method for the preparation of pure fluorine gas. In that method a 3:1 mole-ratio powder mixture of KF to $NiF_2$ is placed in a reactor and contacted with impure gaseous $F_2$ at superatmospheric pressure and 500° C. to absorb the $F_2$ and form a nickel-fluoride complex. The reactor temperature then is lowered to 250°–300° C., and additional impure $F_2$ is admitted to maintain a pressure of several atmospheres therein, with the result that the complex absorbs the $F_2$ in a matter of hours. The reactor temperature then is increased to about 400° C. to decompose the complex and evolve pure $F_2$ at a pressure of about 20 atmospheres. The method is based on the following reversible reaction:

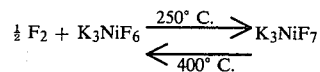

SUMMARY OF THE INVENTION

OBJECTS

It is an object of this invention to provide a novel process for removing gaseous fluorine from gas streams containing the same.

It is another object to provide a novel process for the direct recovery of gaseous fluorine from such streams.

It is another object to provide an efficient dynamic process for effecting recovery of fluorine as a highly pure gas at superatmospheric pressure.

It is another object to provide $K_3NiF_6$ pellets for use in the dynamic process just described.

Additional objects, advantages and novel features of the invention will be set forth in part in the description which follows and will become apparent to those skilled in the art either upon examination of the following or by practice of the invention. The objects and advantages of the invention may be realized and attained by means of the instrumentalities and combinations particularly pointed out in the appended claims.

SUMMARY

In one aspect, the invention can be summarized as a process for removing gaseous fluorine from a gas stream containing the same, the method comprising directing the stream through a bed of anhydrous $K_3NiF_6$ pellets at a temperature effecting fluorination of said pellets to $K_3NiF_7$. In another aspect, the invention comprises removing gaseous fluorine from a gas stream by contacting the stream with anhydrous $K_3NiF_6$ pellets prepared by: providing a 3:1 mole-ratio powder mixture of potassium fluoride to hydrated nickel fluoride; contacting the mixture with finely divided water at a temperature effecting the conversion of said mixture to agglomerates of hydrated $K_3NiF_5$; heating the agglomerates to a temperature effecting sintering but not fusion thereof to form sintered pellets of anhydrous $K_3NiF_5$; and reacting the pellets with gaseous fluorine to convert them to $K_3NiF_6$. In another aspect, the invention is a process for the direct recovery of fluorine from a gas stream containing the same, in which the stream is directed through a bed of anhydrous $K_3NiF_6$ pellets at a temperature of 240°–246° C. to fluorinate the same to $K_3NiF_7$, following which the $K_3NiF_7$ pellets are heated to a temperature effecting evolution of gaseous fluorine therefrom and re-conversion of the pellets to $K_3NiF_6$.

DETAILED DESCRIPTION OF THE INVENTION

Figure 1:
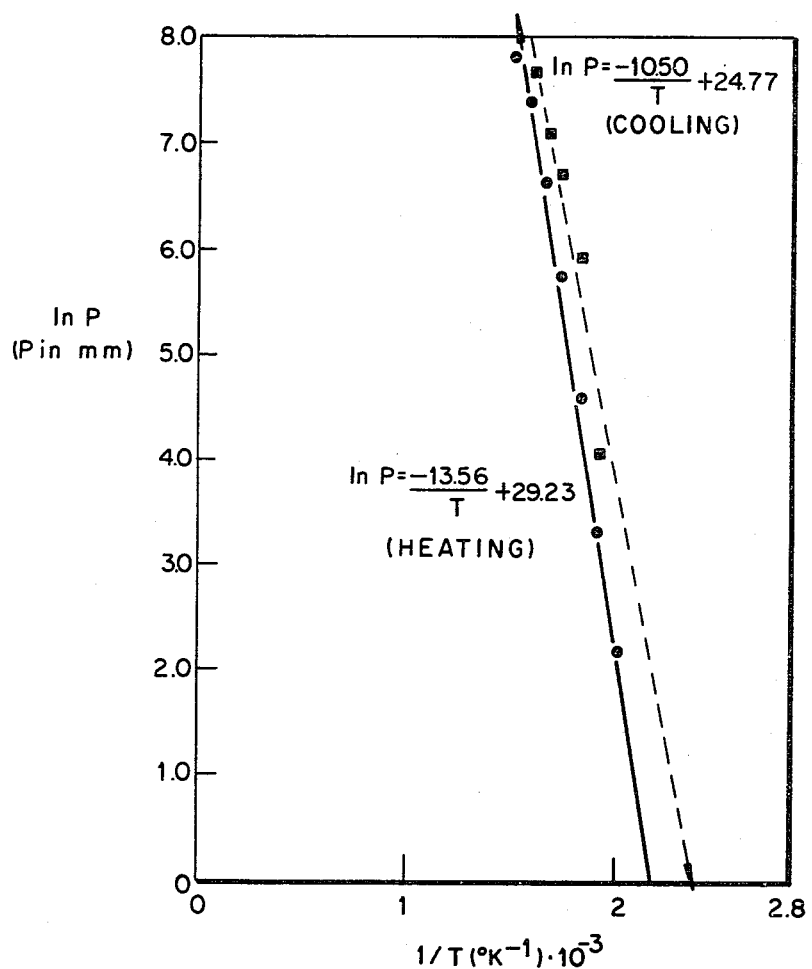
FIG. 1 is a graph correlating temperature and $F_2$ equilibrium vapor pressure for $F_2$ over pelletized $K_3NiF_6$—$K_3NiF_7$.

In its broadest aspect our invention comprises removing gaseous fluorine from a gas stream by contacting the stream with a bed of pelletized anhydrous $K_3NiF_6$ at a temperature effecting the fluorination of the bed to $K_3NiF_7$. While the $K_3NiF_6$ pellets may be prepared by any suitable technique, we prefer to prepare them by the following method: providing a 3:1 mole-ratio powder mixture of KF and nickel fluoride hydrate; exposing the mixture to finely divided water at a temperature effecting the formation of agglomerates of $K_3NiF_5$ hydrate; heating the agglomerates to a temperature effecting sintering but not fusion thereof to form pellets of anhydrous $K_3NiF_5$; and reacting the pellets with fluorine to convert them to $K_3NiF_6$.

The following detailed example illustrates our fluorine-recovery process, including the preferred method for preparing pelletized $K_3NiF_6$ for use as the fluorine absorbent.

EXAMPLE

1. Pellet Preparation

In accordance with the invention, pelletized anhydrous $K_3NiF_6$ was prepared as follows. A rotatable vessel was charged with commercial-grade KF and $NiF_2 \cdot 4H_2O$ powders, in the amounts of 2066 g and 2000 g, respectively. That is, the vessel was charged with a 3:1 mole ratio of KF to $NiF_2 \cdot 4H_2O$. After rotation of the vessel to blend the powders, saturated steam was admitted to the rotating vessel under the following conditions: 1 atm (open vessel), 50° C. (due to steam), to convert the mixture to small, irregular, green agglomerates of $K_3NiF_5 \cdot xH_2$). The agglomerates were dried in air at 200° C. for about two hours; this changed the color of the agglomerates to yellow. The dried agglomerates were sieved, and a portion having a mesh size between 4 and 16 (U. S. Standard) was retained. A batch of the retained agglomerates was converted to sintered pellets in an air-atmosphere furnace preheated to 800° C. When the temperature of the furnaced pellets reached 650° C., they were removed, promptly sieved to remove fines, and then promptly stored in a sealed container. The pellets were dark green, had unfused and somewhat porous surfaces, and were both harder and smaller than before sintering. Microscopic examination showed the pellets to be covered with clear, microscopic crystals. Analysis by X-ray diffraction established that the pellets were anhydrous $K_3NiF_5$.

The sintered pellets were disposed as a bed in a nickel reactor provided with a gas inlet below the bed and a gas outlet above the bed. After the reactor had been warmed to about 200° C., a 50/50 mixture of gaseous $F_2$ and $N_2$ was directed through the bed to produce pellets of unfused $K_3NiF_6$, in accordance with the equation:

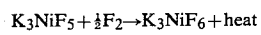

$$K_3NiF_5 + \tfrac{1}{2}F_2 \rightarrow K_3NiF_6 + heat$$

The gas stream was passed through the bed at a flow rate of approximately ½ l/min, until the consumption of fluorine essentially ceased. The temperature then was increased to 400° C. for one hour. The resulting anhydrous pellets were purple in color, were somewhat harder than the sintered pellets, and were very reactive with moisture. X-ray analysis showed them to be $K_3NiF_6$.

An initial series of tests was conducted to characterize the $K_3NiF_6$ pellets with respect to $F_2$ absorption and release under static conditions. FIG. 1 summarizes the test results in terms of $F_2$ pressure as a function of temperature during heating (solid line) and cooling (dashed line) of a bed of the pellets. As shown, the $F_2$ decomposition pressure at 400° C. exceeds 60 psia, and the calculated heat of reaction is about 24 kcal per mole. These tests demonstrated that $K_3NiF_6$ can be prepared in pellet form with retention of its $F_2$-absorption and release characteristics. So far as is known, this has not been demonstrated previously and could not have been predicted with confidence without such tests.

2. $F_2$ Absorption with Bed of Pelletized $K_3NiF_6$

In accordance with the invention, a vertical nickel cylinder was loaded with a bed of $K_3NiF_6$ prepared as described above. The bed had a length of 16" and a diameter of 2". The cylinder, which was provided with adjustable electric heaters, had an inlet for introducing a gas stream to the bottom of the bed, and an outlet for removing the gaseous effluent from the top of the bed. Standard instrumentation was provided to measure the pressure of the inflow to the cylinder, the mass outflow therefrom, and the differential pressure across the bed. In addition, the composition of the bed effluent was recorded continuously by a Beckman DU Ultraviolet Analyzer.

Figure 2:
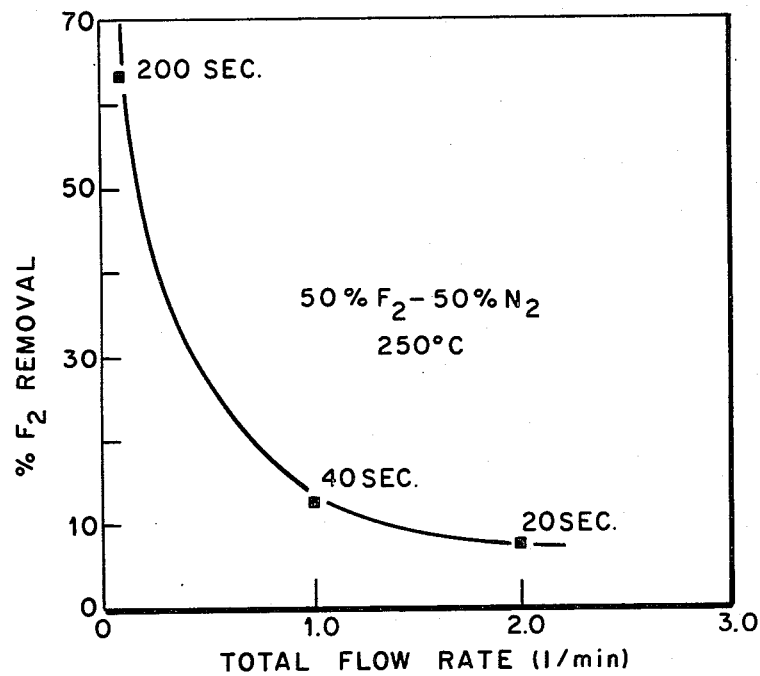
FIG. 2 is a graph correlating $F_2$ removal and total flow rate for a 50% $F_2$–50% $N_2$ gas stream passed through a fixed bed of pelletized $K_3NiF_6$ at 250° C.
Figure 3:
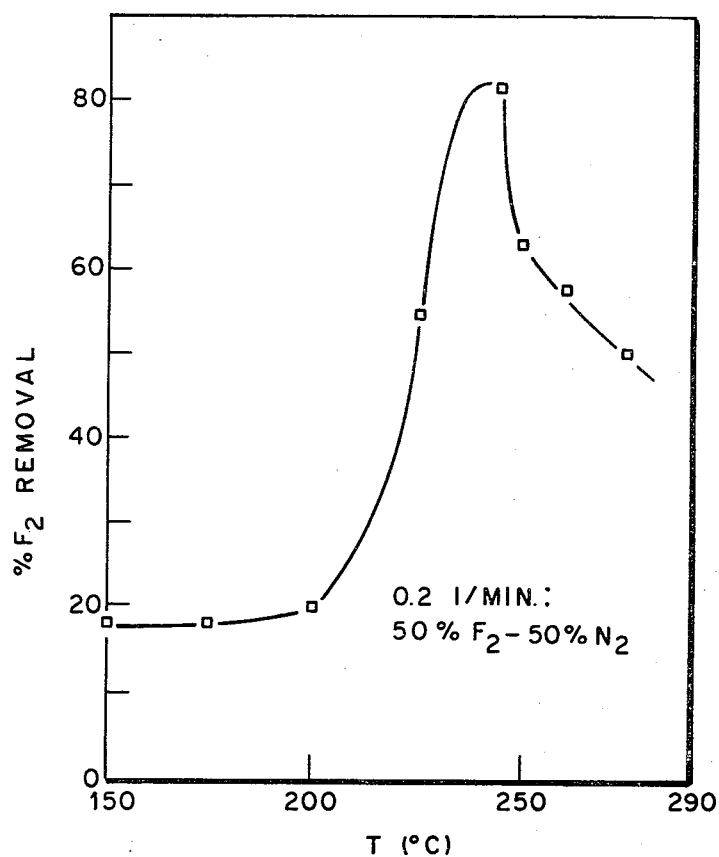
FIG. 3 is a graph correlating $F_2$-removal and temperature for a 50% $F_2$-50% $N_2$ stream passed through a fixed bed of $K_3NiF_6$ at a constant flow rate.

The above-described system was used in a series of dynamic tests in which a gas stream composed of either 50% $F_2$-50% $N_2$ or 50% $F_2$-50% $O_2$ was passed through the pelletized bed. FIG. 2 correlates $F_2$-removal efficiency and flow rate for a series of runs conducted with 50% $F_2$-50% $N_2$, at a bed temperature of 250° C. As shown, removal efficiencies exceeding 60% were obtained at superficial bed-residence times exceeding about 200 sec. FIG. 3 correlates $F_2$-removal efficiency and temperature for a series of runs conducted with 50% $F_2$-50% $N_2$ gas streams at a constant total flow of 0.2 l/min (which corresponds to superficial bed-residence time of 180 seconds). As shown, these runs established the existence of an optimum temperature of 244° C. for maximum removal of $F_2$. In the run (FIG. 3) conducted at this temperature, better than 80% removal of $F_2$ was effected. (In other runs conducted at longer residence times a removal efficiency of about 90% was obtained.) Thus, we prefer to conduct our $F_2$-absorption operation at a temperature at or near 244° C.—e.g., in the range of 225°–250° C.—most preferably, 240°–246° C. It will be noted that these ranges are below the absorption-temperature range of 250°–300° C. taught in above-reference U.S. Pat. No. 3,989,808. $F_2$-removal efficiencies of at least 70% are obtained in the range from about 200°–275° C. Referring to FIGS. 1–3, similar results were obtained in runs conducted with 50/50 mixtures of $F_2$ and $O_2$.

Figure 4:
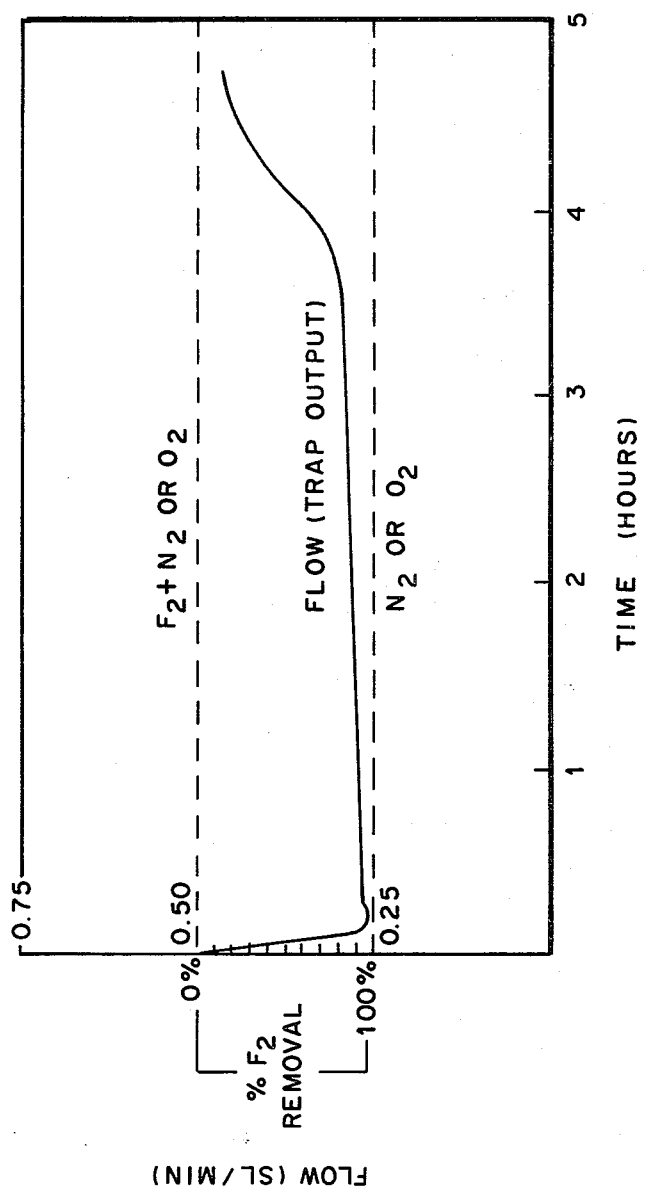
FIG. 4 depicts a typical $F_2$ outlet concentration-time-breakthrough profile for a bed of pelletized $K_3NiF_6$ being exposed to a $F_2$-containing stream in accordance with the invention.

FIG. 4 depicts a typical concentration-time versus breakthrough profile for runs conducted in the above-described system with 50/50 gas streams consisting of either $F_2$ and $N_2$ or $F_2$ and $O_2$.

3. Desorption of Absorbed $F_2$ from Beds of Pelletized $K_3NiF_7$

Following $F_2$-absorption runs of the kind described above, the resulting beds containing absorbed $F_2$ were heated to 400° C. in situ to desorb gaseous $F_2$. The pressure of the desorbed $F_2$ over the bed exceeded 60 psia. Such pressures are ample for effecting the flow of the desorbed gas into storage cylinders, transport lines, and the like. Corrosive-gas chromatography analysis showed the desorbed $F_2$ to have a purity exceeding 99.5%. In a typical operation, essentially complete regeneration of the bed was effected by maintaining the bed at 400° C. for ½ hour. Longevity tests of typical beds showed that their $F_2$-removal efficiency remained high (above 80%) after twenty $F_2$-absorption and -desorption cycles.

Referring to Section 1 of the foregoing Example, the powder mixture from which the agglomerates are formed may comprise KF and any nickel fluoride hydrate. Satisfactory results were not obtained with anhydrous nickel fluoride. While we prefer to conduct the agglomeration step with finely divided water in the form of saturated steam, the water may be provided in the form of an aerosol. Mixing the powders with a quantity of liquid water did not produce agglomerates. If an aerosol is used in place of steam, the powder and aerosol should be contacted at an elevated temperature effecting the formation of $K_3NiF_5$ hydrate. Although the foregoing Example refers to sieving the dried agglomerates to obtain a fraction having a mesh size of 4–16, this is not a critical parameter and other size ranges may be more suitable for some applications. The Example cites drying the agglomerates in one step and sintering them in a succeeding step, but these steps may be combined. In the sintering step we prefer to load the agglomerates into a pre-heated furnace in order to obtain rapid heat-up of the agglomerates; this is believed to increase the surface area of the product pellets. In any event, we have found that the sintering operation results in a considerable increase in $F_2$-absorption efficiency. In the sintering step we avoid fusion, or melting, of the pellet surfaces, we prefer to maintain the pellet temperature in the range from about 600° C. to 700° C. Referring now to the fluroination of the sintered pellets to $K_3NiF_6$, the fluorination conditions should be controlled to avoid fusing of the surfaces of the pellets. We prefer to keep the pellet temperature below about 450° C. Fluorination can be effected with a mixture of fluorine and any suitable carrier gas—i.e., a carrier gas non-reactive with the pellets. Fluorination is continued until substantially all of the pellets are converted to $K_3NiF_6$, as determined by the presence of excess fluorine in the outlet. (That is, the $F_2$ concentration at the outlet approaches the $F_2$ concentration of the inlet.)

Referring to Section 2 of the foregoing Example, we have found that the $F_2$-absorption bed should be operated at a temperature at or near 244° C. (e.g., at a temperature in the range of 240°–246° C.) to minimize residence times and obtain good overall economics. Preferably, the bed-residence time is in the range of from 100–1000 seconds. The preferred time depends on reactor size and the desired removal efficiency. Our process is most efficient when used with gas streams comprising a relatively high percentage of $F_2$—e.g., streams containing 50 mole percent or more of $F_2$. As indicated, our process is applicable to $F_2$-containing streams which also contain $N_2$ and/or $O_2$. In addition, the process can be used to selectively absorb $F_2$ from mixtures, containing various other gases as, for example neon, argon, and other inert gases, as well as gaseous fluorocarbons.

Referring to Section 3 of the Example, we prefer to regenerate the used bed at temperatures in the range of from about 350° to 400° C. Below this range, the $F_2$-desorption time is inconveniently long; above about 500° C., some fusing of the pellet surfaces may result, reducing their capacity for $F_2$ in subsequent absorption operations.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto. The characteristics of the above-mentioned anhydrous $K_3NiF_6$ pellets have not yet been well enough defined to permit accurate definition in terms other than the process for making them.

What is claimed is:

1. A process for the removal of gaseous fluorine from a gas stream containing the same, said process comprising:
   directing said stream through a bed of sintered anhydrous $K_3NiF_6$ pellets at a temperature effecting fluorination of said pellets to $K_3NiF_7$.

2. The process of claim 1 wherein said temperature is in the range of from 225°–250° C.

3. The process of claim 2 wherein said temperature is maintained in the range of from about 240°–246° C.

4. The process of claim 1 further characterized by the step of heating the fluorinated pellets to a temperature effecting evolution of gaseous fluorine therefrom and re-conversion of said pellets to $K_3NiF_6$.

5. A method for the production of $K_3NiF_6$ pellets for use in the process of claim 1, comprising:
   providing a 3:1 mole-ratio mixture of powdered potassium fluoride and nickel fluoride hydrate,
   contacting said mixture with finely divided water at a temperature effecting formation of agglomerates of $K_3NiF_5$ hydrate,
   heating said agglomerates to a temperature effecting sintering but not fusion thereof to form sintered pellets of anhydrous $K_3NiF_5$, and
   contacting said pellets with gaseous fluorine at a temperature effecting their conversion to unfused pellets of $K_3NiF_6$.

6. A process for the removal of gaseous fluorine from a gas stream containing the same, comprising:
   contacting said stream with anhydrous $K_3NiF_6$ pellets, said pellets having been prepared by the steps of:
   (a) providing a 3:1 mole-ratio powder mixture of potassium fluoride and hydrated nickel fluoride,
   (b) contacting said mixture with finely divided water at a temperature effecting conversion of said mixture to agglomerates of hydrated $K_3NiF_5$,
   (c) heating the agglomerates to a temperature effecting sintering but not fusion thereof to form sintered pellets of anhydrous $K_3NiF_5$, and (d) reacting said pellets with gaseous fluorine to convert them to $K_3NiF_6$.

7. The process of claim 6 wherein said stream and pellets are contacted at a temperature in the range from 225°–250° C.

8. The process of claim 7 wherein said range is from about 240°–246° C.

9. Anhydrous $K_3NiF_6$ pellets prepared by steps (a)–(d) of claim 6.

10. A process for the direct recovery of fluorine from a gas stream containing the same, comprising:
  directing said stream through a bed of anhydrous $K_3NiF_6$ pellets at a temperature in the range of from 225° C. to 250° C. to fluorinate said pellets to $K_3NiF_7$, and
  heating the resulting $K_3NiF_7$ pellets to a temperature effecting evolution of fluorine therefrom and reconversion of said pellets to $K_3NiF_6$.

11. The process of claim 10 wherein the superficial bed-residence time of said stream is in the range of from about 100 to 1000 seconds.

12. The method of claim 5 wherein said mixture is contacted with one of a water aerosol and saturated steam.

13. A process for preferentially recovering fluorine from a gas stream containing fluorine and at least one non-fluorinating gas selected from the group consisting of inert gases, nitrogen, oxygen, and fluorocarbons, said process comprising:
  directing said stream through a bed of sintered anhydrous $K_3NiF_6$ pellets at a temperature in the range of from 240°–246° C., the residence time of said stream in said bed being in the range of 100 to 1000 seconds, to effect fluorination of said pellets to $K_3NiF_7$.

* * * * *